Figure 1:
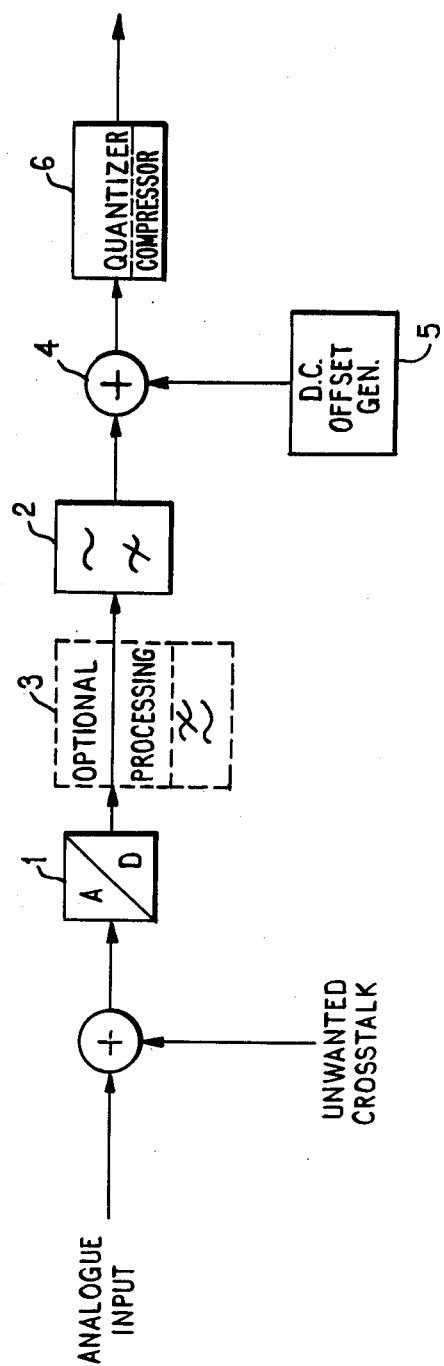

United States Patent [19]

Gingell

[11] 4,288,873
[45] Sep. 8, 1981

[54] ANALOGUE TO DIGITAL CONVERTERS
[75] Inventor: Michael J. Gingell, Raleigh, N.C.
[73] Assignee: International Standard Electric Corporation, New York, N.Y.
[21] Appl. No.: 96,728
[22] Filed: Nov. 23, 1979
[51] Int. Cl.³ .................. H03K 13/01; H04B 12/02
[52] U.S. Cl. ..................................... 375/25; 370/6; 340/347 AD
[58] Field of Search ............... 340/347 AD, 347 CC; 375/25, 26, 34, 30; 364/724; 332/11 R, 11 D; 370/6

[56] References Cited
U.S. PATENT DOCUMENTS
3,872,466  3/1975  Wold ........................... 340/347 CC
3,904,963  9/1975  Bellanger ........................ 375/26
3,949,170  4/1976  Shionoya ......................... 375/34
3,973,209  8/1976  Nossen ........................ 340/347 AD Primary Examiner—Benedict V. Safourek
Attorney, Agent, or Firm—John T. O'Halloran; Jeffrey P. Morris

[57] ABSTRACT

A p.c.m. encoder comprises a high accuracy linear A/D converter followed by a digital high pass filter, a d.c. offset circuit and a digital compressor. The high pass filter removes any d.c. offset from the encoded signal and the offset circuit then reintroduces a controlled amount of d.c. offset. By this means the performance can be improved especially in regard to idle noise and crosstalk enhancement.

3 Claims, 3 Drawing Figures

ANALOGUE TO DIGITAL CONVERTERS

This invention relates to p.c.m. encoders and is particularly suitable for use in a single channel p.c.m. system, such as may be used in a subscriber's telephone instrument.

One of the problems encountered in a single channel system (SSC) is caused by the presence of idle noise, particularly when a compressed p.c.m. code is used. One method of producing a compressed p.c.m. code is to encode linearly the audio signal initially to a higher precision and at a higher sampling frequency (32 kHz) than is actually needed for 8-bit A or $\mu$ law operation. This is so that the noise contribution from this operation plus the noise from subsequent digital filtering, reduction in sampling rate to 8 kHz and compression to A or $\mu$ law (which involves a reduction in the number of data bits) will, in total, be well within the overall noise budget.

When the signal is encoded it is not possible to avoid a small DC offset which could be equivalent to plus or minus several least significant bits (LSB's) of the final compressed code. In consequence, the encoding characteristic is positioned arbitarily on the staircase transfer function. Exactly the same condition exists with conventional encoding techniques and has been studied by Shennum & Gray, "Performance Limitations of a Practical PCM Terminal", BSTJ Jan. 1962 pp 143–171. One of the most significant results of their work was to show how idle noise varied with dc offset as a function of input noise. Idle noise can be up to three times (4.8.db) more than the theoretical quantizing noise depending on the dc basis point. In 8-bit A law, for example, the theoretical quantizing noise is −74.6 dBmOp at low signal levels. In practice, measured levels of idle noise can very from zero if the bias is at mid-tread to −69.8 dBmOp if the bias is at mid-riser when the slightest input will cause the output to jitter one bit peak-to-peak. Under this last condition crosstalk can be enhanced from say −80 dBmO to a total powr of −69.2 dBmO. In conventional p.c.m. encoders this situation cannot be controlled.

According to the present invention there is provided a p.c.m. encoding arrangement comprising a linear analogue-to-digital converter producing pulse code groups each containing a first number of bits (pulses), a digital high pass filter to which the converter output is applied, and means for adding to the filter output a predetermined amount of dc offset.

The effect of the high pass filter is to block completely any uncontrolled dc offset appearing before a digital compressor so that the system performance can be precisely defined and accurately reproduced.

An embodiment of the invention will now be described with reference to the accompanying drawings, in which FIG. 1 is a block diagram of a p.c.m. encoder for a single channel system.

Figure 2:
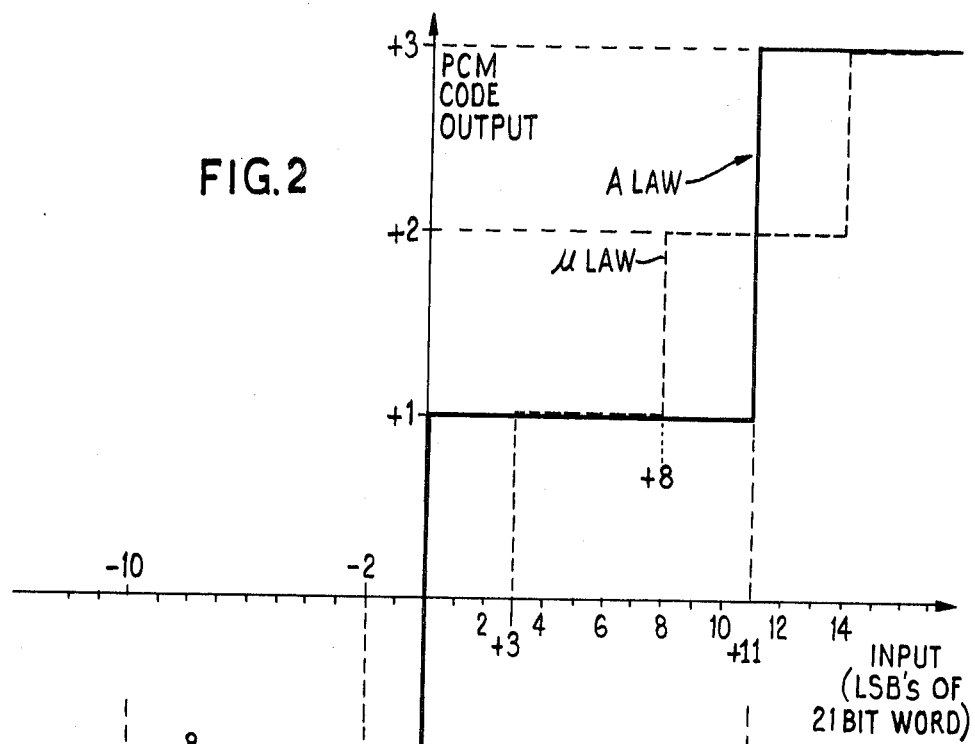
Figure 3:
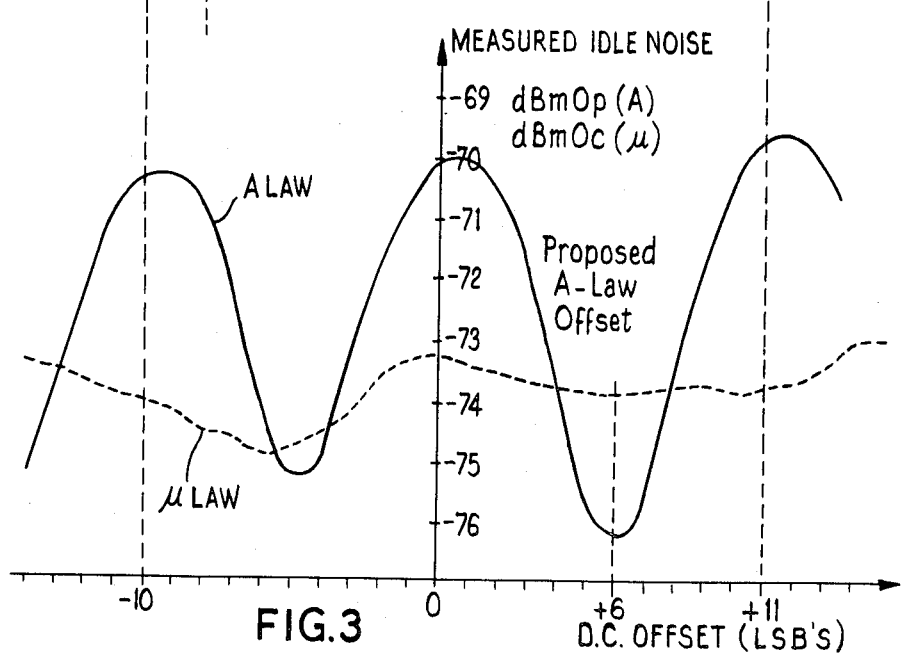

FIG. 2 shows the 8-bit A and $\mu$ law companding transfer characteristic about the zero region, and FIG. 3 shows how measured idle noise varies with offset and how A law is much more susceptible.

In the arrangement shown in FIG. 1 the input to a high accuracy linear A/D converter 1 may be considered as an analogue signal to which may be added potential unwanted crosstalk picked up at or before the input to the converter. The converter 1 may be any conventional linear converter. The high resolution, e.g. 21-bit, p.c.m. output is then fed to a digital high pass filter 2. (If required there may be optional processing of the high resolution p.c.m. signal before it is high pass filtered, as at 3 in FIG. 1. This may include low pass filtering, sample rate changing, equalizing etc.). The high pass filter 2 effectively blocks any dc offset contained in the high resolution p.c.m. signal. A controlled dc offset is then added to the high pass filtered signal at 4, this offset being produced by a dc offset generator 5. The effect of this is to minimise idle noise and crosstalk enhancement. Finally the p.c.m. signal with controlled dc offset is applied to a digital compressor or quantizer 6 which reduces the number of bits per sample and if required can convert the linear p.c.m. signal to a non-linear A or $\mu$ law signal, as defined by CCITT.

Consider first the idle noise situation FIG. 2 shows the 8-bit A and $\mu$ law companding transfer characteristic about the zero region. It can be seen that, for A law, one step corresponds to $10\frac{2}{3}$ LSB's of the 21 bit linear input words to the compressor. The compressor decision point is in fact at the first whole number of bits above N. $10\frac{2}{3}$. Similarly for $\mu$-law the minimum step size is $5\frac{1}{3}$ LSB's but with the origin at mid tread instead of mid riser.

The high pass filter completely blocks all input dc and instead leaves a permanent offset of minus one LSB at its output. By including an adder after the high pass it is possible to examine the effect of varying the dc offset of the signal going into the compressor. FIG. 3 shows how measured idle noise varies with offset and how A law is much more susceptible. In fact without any offset the A law is at its theoretical worst of −70 dBmOp. It should be pointed out that the encoding and digital filtering processes produce a noise signal at the input to the compressor, which is of the order of 20 pWop. This is Gaussian in nature and occasionally contains components which exceed 11 bits peak-to-peak. Therefore, even when there is no input signal and the compressor is biased midway between risers, a proportion of samples cause crossing of the adjacent decision levels and thus a minimum amount of output noise from the expander. To this must be added noise contributions from the receive low pas filters and decoder LSI circuit. The overall idle noise level under these conditions can be as low as −76 dBmOp.

With $\mu$ law the effect is not so pronounced although it is still observable. This is because the input noise is large in comparison with step size and causes very frequent crossing of adjacent decision levels.

North American D3 PCM transmission systems use $\mu$ law and 7 5/6 bits—that is every sixth sample is only 7 bits accurate to allow for signalling. In the 7 bit mode the characteristic is like A law crossing the origin vertically. This one sample in six will contribute most of the idle noise making it at least 1.25 dB worse than the theoretical quantizing noise of 8 bit $\mu$ law.

In the European common equipment chips it is proposed to include a permanent dc offset before the compressor (on A law only) to bias the transfer characteristic about $\frac{1}{2}$ a step positive to ensure optimum idle noise performance.

Consider now gain tracking and crosstalk enhancement if a test is made of output against input, measured selectively with a sinewave input, the result is usually called Gain or Level Tracking. However, at low levels the test has another significance and can be related to crosstalk enhancement.

Consider the following test:

| 1 kHz Input Signal Level dBmO | Output Level dBmO | Conclusions |
|---|---|---|
| +10 | +4.5 | Overload |
| + 3 | +3.0 | |
| + 0 | 0.0 | |
| −20 | −20.0 | Linearity |
| −40 | −40.0 | |
| −60 | −59.9 | |
| −80 | −70.0 | Crosstalk Enhancement |

The last measurement at −80 dBmO is the result of the −80 dBmO being turned into a square wave of 1 least significant step by the companding process.

The next table shows some measured results on the SSC system with the high pass in and out of circuit. The crosstalk enhancement is not so bad as might be expected at first sight because noise from the encoder and digital filters acts as a dither signal.

| | Output Level dBmO (All tests made with 802 Hz Sinewave) | | | | | | | |
|---|---|---|---|---|---|---|---|---|
| | 8 Bit μ Law | | 8 Bit A Law | | | | | |
| | High Pass | | No | With High Pass & Offset of: | | | | |
| Input | Out | In | High Pass | 0 | 1 | 3 | 6 | LSB |
| 0 | 0.0 | 0.0 | 0.0 | 0.0 | 0.0 | 0.0 | 0.0 | |
| −50 | −50.2 | −50.2 | −50.2 | −50.1 | −50.3 | −50.2 | −50.3 | |
| −60 | −60.3 | −60.5 | −60.3 | −60.4 | −60.5 | −60.7 | −60.9 | |
| −70 | −70.1 | −71.0 | −71.9 | −69.2 | −69.3 | −71.0 | −73.2 | |
| −80 | −80.0 | −81.0 | −84.0 | −77.2 | −77.6 | −81.1 | −86.5 | |
| −90 | −91.0 | −92.0 | −93.0 | −87.0 | −87.2 | −89.0 | −96.0 | |

The table shows that, for A law, there is an optimum offset for best linearity performance. With no offset transfer characteristic is 3 dB off linear at −90 dBmO which would cause a 3 dB enhancement of a −90 dBmO crosstalk signal. With an offset of 6 LSB's which is equivalent to half an A law minimum step the transfer curve bends the other way and a −90 dBmO input signal would be attenuated to −96 dBmO.

With μ law the effects are not easily measurable and no appreciable advantage can be gained by introducing an offset.

Although the invention has been described above in relation to an encoder using digital compression after the addition of the controlled dc offset it is not limited to this type of encoder but is also applicable, for example, in cases where the number of linear p.c.m. bits is restricted by means of simple truncation.

I claim:

1. A pulse code modulated encoding arrangement comprising a linear analogue-to-digital converter having an input analogue signal coupled thereto and producing pulse code groups each containing a first number of bits, a digital high pass filter to which the analogue-to-digital converter output is applied to remove unwanted dc offset and low frequency components present in said input analogue signal and generated in said analogue-to-digital converter, and means for adding to the high pass filter output a predetermined amount of dc offset for minimizing idle noise and reducing crosstalk enhancement.

2. An arrangement according to claim 1 including a low pass filtering means interposed between the linear analogue-to-digital converter and the digital high pass filter.

3. An arrangement according to claim 1 or 2 including means for digitally compressing the filter output containing the added dc offset.

* * * * *